(12) United States Patent
Lee et al.

(10) Patent No.: US 11,872,908 B2
(45) Date of Patent: Jan. 16, 2024

(54) METHOD FOR CONTROLLING THERMAL MANAGEMENT SYSTEMS OF POWER PLANT

(71) Applicants: Hyundai Motor Company, Seoul (KR); Kia Corporation, Seoul (KR)

(72) Inventors: Hyun Jae Lee, Seoul (KR); Yei Sik Jeon, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/974,834

(22) Filed: Oct. 27, 2022

(65) Prior Publication Data

US 2023/0055069 A1 Feb. 23, 2023

Related U.S. Application Data

(62) Division of application No. 16/287,357, filed on Feb. 27, 2019, now Pat. No. 11,642,982.

(30) Foreign Application Priority Data

Nov. 29, 2018 (KR) .................. 10-2018-0151082

(51) Int. Cl.
*B60L 58/32* (2019.01)
*H01M 8/0432* (2016.01)
*H01M 8/04029* (2016.01)
*H01M 8/04701* (2016.01)

(52) U.S. Cl.
CPC ......... *B60L 58/32* (2019.02); *H01M 8/04029* (2013.01); *H01M 8/04358* (2013.01); *H01M 8/04701* (2013.01); *B60L 2240/36* (2013.01); *H01M 2250/20* (2013.01)

(58) Field of Classification Search
CPC ...... B60L 58/32; B60L 2240/36; B60L 58/33; B60L 3/0053; H01M 8/04029; H01M 8/04358; H01M 8/04701; H01M 2250/20; H01M 8/04723; H01M 8/04007; H01M 8/04768; H01M 8/04992; Y02E 60/50; Y02T 10/70; Y02T 90/40; B60Y 2306/05
See application file for complete search history.

(56) References Cited

U.S. PATENT DOCUMENTS 6,093,500 A 7/2000 Margiott et al.
6,651,761 B1 11/2003 Hrovat et al.

FOREIGN PATENT DOCUMENTS

JP 2007-257976 A 10/2007
KR 100837975 B1 6/2008
KR 10-2015-0057596 A 5/2015

*Primary Examiner* — Helen Oi K Conley
(74) *Attorney, Agent, or Firm* — Fox Rothschild LLP (57) ABSTRACT

A power plant thermal-management-system control method for controlling thermal management systems in PMCs is provided. The thermal management systems are operated based on coolant temperatures of the PMCs of a power plant of a fuel cell vehicle to prevent the temperatures of the PMCs from deviating from a reference range, which in turn prevents degradation of fuel cells.

4 Claims, 9 Drawing Sheets

METHOD FOR CONTROLLING THERMAL MANAGEMENT SYSTEMS OF POWER PLANT

CROSS-REFERENCE TO RELATED APPLICATION

This Application is a Division of application Ser. No. 16/287,357 filed on Feb. 27, 2019, which claims the benefit of priority to Korean Patent Application No. 10-2018-0151082, filed on Nov. 29, 2018, the entire contents of which are incorporated herein by reference.

TECHNICAL FIELD

The present disclosure relates to a technology for controlling thermal management systems (TMSs) of a power plant mounted in a fuel cell vehicle, and more particularly, to a power plant thermal-management-system control method that controls the thermal management systems in power module completes of the power plant of the fuel cell vehicle to prevent the temperatures of the PMCs from deviating from a reference range and prevent degradation of a fuel cell.

BACKGROUND

A fuel cell vehicle includes a fuel cell stack in which a plurality of fuel cells used as a power source are stacked, a fuel supply system that supplies hydrogen fuel into the fuel cell stack, an air supply system that supplies oxygen as an oxidizing agent required for an electro-chemical reaction, and a water and heat management system that adjusts the temperature of the fuel cell stack. The fuel supply system reduces the pressure of compressed hydrogen inside a hydrogen tank and supplies the hydrogen to fuel electrodes (anodes) of the fuel cell stack, and the air supply system supplies external air, which is suctioned by operating an air blower, to air electrodes (cathodes) of the fuel cell stack.

When hydrogen and oxygen are supplied to the fuel electrodes and the air electrodes of the fuel cell stack, respectively, hydrogen ions are separated through a catalytic reaction at the fuel electrodes. The separated hydrogen ions are delivered to the cathodes, which are air electrodes, through electrolyte membranes, and at the cathodes, electrical energy may be obtained by an electro-chemical reaction of the hydrogen ions, which are separated at the fuel electrodes, with electrons and oxygen. Specifically, at the fuel electrodes, hydrogen undergoes electrochemical oxidation and at the air electrodes, oxygen undergoes electro-chemical reduction. At this time, electricity and heat are produced by movement of generated electrons, and water vapor or water is produced by chemical action in which hydrogen and oxygen are combined.

A discharge apparatus is provided to discharge byproducts such as water vapor, water, and heat produced in the electrical energy generation process of the fuel cell stack, un-reacted hydrogen and oxygen, and the like. Gases, such as water vapor, hydrogen, and oxygen, are discharged into the atmosphere through an exhaust passage. Components, such as an air blower, a hydrogen recirculation blower, and a water pump, for operating a fuel cell are connected to a main bus terminal to facilitate start of the fuel cell, and various types of relays for facilitating interruption and connection of power and a diode for preventing backward current to the fuel cell may be connected to the main bus terminal. Additionally, dry air supplied through the air blower is humidified using a humidifier and is then supplied to the cathodes (the air electrodes) of the fuel cell stack, and exhaust gas of the cathodes, which is humidified by a water component generated in the cathodes, may be delivered to the humidifier to humidify thy air to be supplied to the cathodes by the air blower.

Meanwhile, a commercial fuel cell vehicle is equipped with a power plant in which power module completes (PMCs) applied to a passenger fuel cell vehicle are disposed in parallel. In other words, the commercial fuel cell vehicle is equipped with a power plant having a plurality of PMCs disposed in parallel. Accordingly, cooling lines (pipes) are provided to connect TMSs of the PMCs in series with respect to one radiator. In particular, the lengths of the cooling lines from the radiator to the PMCs differ from each other because separation distances between the radiator and the PMCs differ from each other. Accordingly, the flow rates and temperatures of coolant delivered from the radiator to the PMCs differ from each other.

In the related art, coolant supply pumps (CSPs) and coolant temperature control valves (CTVs) of the TMSs in the PMCs are identically controlled despite the difference between the flow rates and temperatures of the coolant delivered from the radiator to the PMCs. Therefore, the temperatures of the coolant may deviate from the temperature range of coolant that corresponds to the power output of a fuel cell. Consequently, degradation of the fuel cell may be accelerated.

SUMMARY

The present disclosure provides a power plant thermal-management-system control method for controlling thermal management systems in PMCs constituting a power plant of a fuel cell vehicle, based on coolant temperatures of the PMCs, thereby preventing the temperatures of the PMCs from deviating from a reference range, which in turn prevents degradation of a fuel cell.

Another aspect of the present disclosure provides a power plant thermal-management-system control method for opening a CTV of a first PMC to the maximum for reference time and operating a thermal management system of a second PMC in operation to the maximum for the reference time when the first PMC in operation is stopped, thereby rapidly cooling the first PMC using the thermal management system of the second PMC, which in turn prevents degradation of the first PMC.

The technical problems to be solved by the present disclosure are not limited to the aforementioned problems, and any other technical problems not mentioned herein will be clearly understood from the following description by those skilled in the art to which the present disclosure pertains. Also, it will be easily understood that the aspects and advantages of the present disclosure can be accomplished by the means set forth in the appended claims and combinations thereof.

According to an aspect of the present disclosure, a method for controlling thermal management systems of a power plant may include receiving coolant temperature values from power module completes (PMCs) of the power plant by a controller, determining a representative value by the controller, based on the temperature values received from the PMCs, transmitting the determined representative value to the PMCs by the controller, and operating the thermal management systems using controllers of the PMCs, based on the representative value received.

The determining of the representative value may include determining an average of the temperature values, which are received from the PMCs, as the representative value. Additionally, the determining of the representative value may include determining a maximum value of the temperature values, which are received from the PMCs, as the representative value. The temperature values may be measured at coolant outlets of fuel cells included in the PMCs. Each of the thermal management systems may include a coolant temperature control valve (CTV) and a coolant supply pump (CSP). The operating of the thermal management systems may include storing a first table and a second table by the controllers of the PMCs. An opening degree of the CTV that corresponds to the representative value may be stored in the first table and a revolution per minute (RPM) value of the CSP that corresponds to the representative value may be stored in the second table. In particular, the controllers of the PMCs may be configured to store the same first and second tables.

According to another aspect of the present disclosure, a method for controlling thermal management systems of a power plant may include generating, by a controller, tables for PMCs of the power plant, wherein RPM values of a CSP that correspond to coolant temperatures are stored in the tables, distributing, by the controller, the generated tables to the corresponding PMCs, and operating the thermal management systems based on the distributed tables.

The generating of the tables may include generating the tables based on a cooling difference according to separation distances between a radiator and the PMCs. The coolant temperatures may be measured at coolant outlets of fuel cells included in the PMCs. Each of the thermal management systems may include a CTV and a CSP. The operating of the thermal management systems may include storing opening degree tables by the controllers of the PMCs. The opening degrees of the CTV that correspond to the coolant temperatures may be stored in the opening degree tables. In particular, the controllers of the PMCs may be configured to store the same opening degree table.

According to another aspect of the present disclosure, a method for controlling thermal management systems of a power plant may include opening, by a controller, a CTV of a second PMC when the second PMC in operation is stopped, with a first PMC in operation, operating, by the controller, a thermal management system of the first PMC to the maximum, closing, by the controller, the CTV of the second PMC when reference time elapses, and operating the thermal management system of the first PMC normally when the reference time elapses.

The opening of the CTV of the second PMC may include opening the CTV of the second PMC to an opening degree of about 100%. The operating of the thermal management system of the first PMC to the maximum may include opening a CTV of the first PMC to an opening degree of about 100% and operating a CSP of the first PMC at a maximum RPM. The closing of the CTV of the second PMC may include closing the CTV of the second PMC to an opening degree of about 0%.

BRIEF DESCRIPTION OF THE DRAWINGS

The above and other objects, features and advantages of the present disclosure will be more apparent from the following detailed description taken in conjunction with the accompanying drawings:

FIG. 4A is a view illustrating a thermal management system piping structure of a power plant according to an exemplary embodiment of the present disclosure, where FIG. 4A illustrates a coolant circulation structure with both a first PMC and a second PMC in operation;

FIG. 4B is a view illustrating a thermal management system piping structure of a power plant according to an exemplary embodiment of the present disclosure, where FIG. 4B illustrates a coolant circulation structure with a first PMC in operation and a second PMC stopped;

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, exemplary embodiments of the present disclosure will be described in detail with reference to the accompanying drawings. It should be understood that even if shown in different drawings, identical components are provided with identical reference numerals in the drawings. Furthermore, in describing the exemplary embodiments of the present disclosure, detailed descriptions related to well-known functions or configurations will be omitted when they may make subject matters of the present disclosure unnecessarily obscure.

Terms, such as "first", "second", "A", "B", "(a)", "(b)", and the like, may be used herein to describe components of the present disclosure. Such terms are only used to distinguish one component from another component, and the substance, sequence, order, or number of these components is not limited by these terms. Unless otherwise defined, all terms used herein, including technical and scientific terms, have the same meaning as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Figure 1:
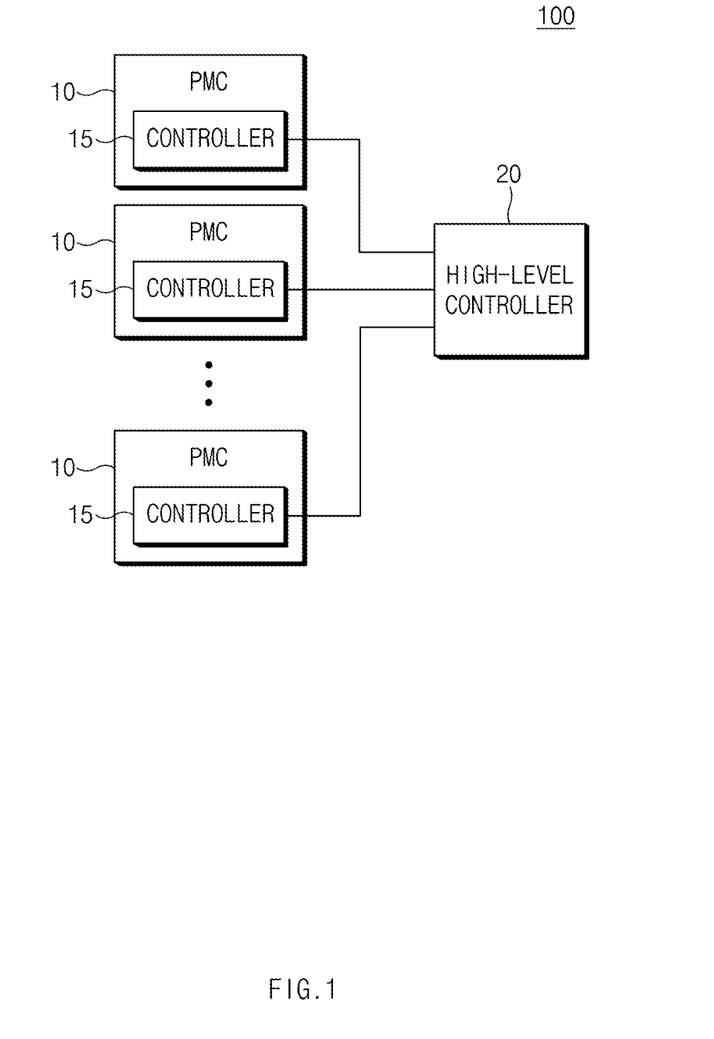
FIG. 1 is a view illustrating a structure for controlling thermal management systems of a power plant according to an exemplary embodiment of the present disclosure.

FIG. 1 is a view illustrating a structure for controlling thermal management systems of a power plant according to an exemplary embodiment of the present disclosure. As illustrated in FIG. 1, the structure 100 for controlling the thermal management systems of the power plant according to the exemplary embodiment of the present disclosure has a structure in which a controller 20 may be configured to execute overall operation of the power plant including a plurality of power module completes (PMCs) 10. The controller 20 may be considered a high-level controller, a main controller, or primary controller.

Figure 2:
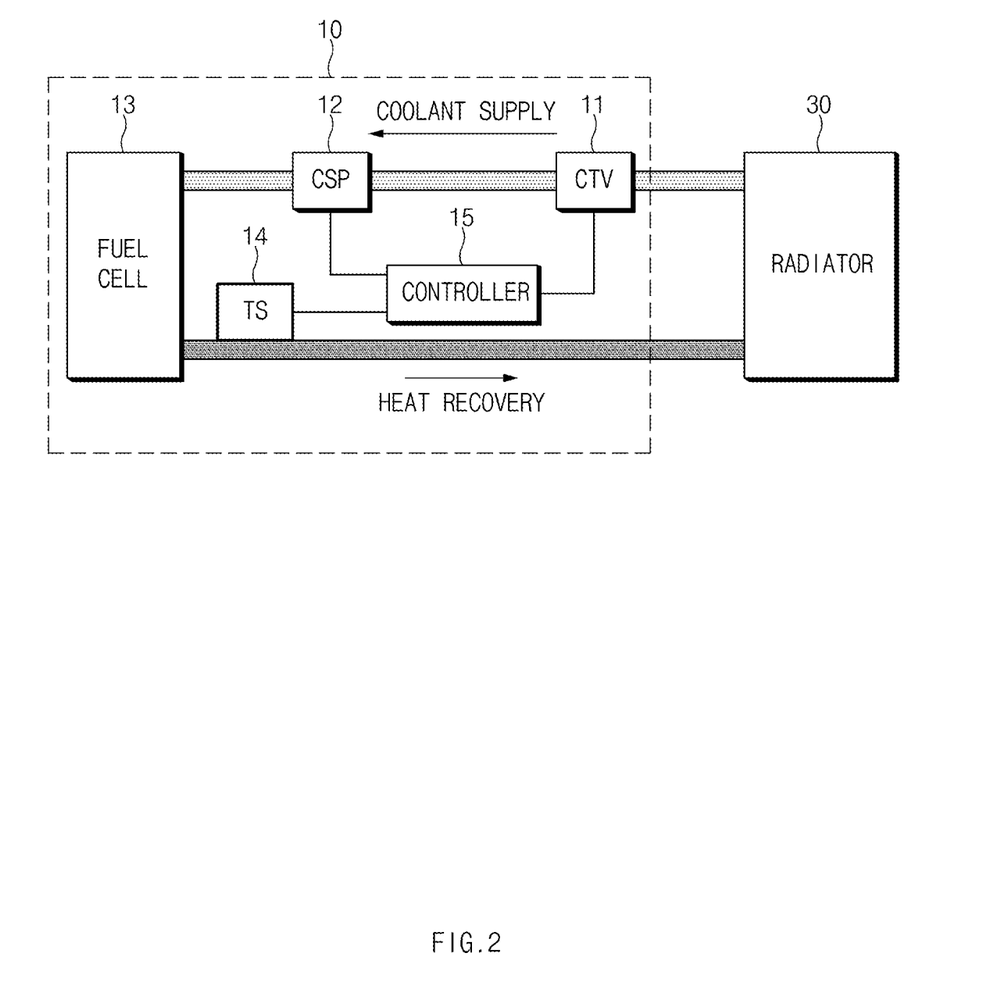
FIG. 2 is a view illustrating a structure of PMCs of the power plant, according to an exemplary embodiment of the present disclosure.

Particularly, each of the PMCs 10 may include a thermal management system. A controller 15 (e.g., subordinate controller, low-level controller, secondary controller, etc.) included in each PMC 10 may be configured to operate the corresponding thermal management system. The high-level controller 20 may be configured to operate the controllers 15 included in the PMCs 10. The PMCs 10 may have, for example, a structure as illustrated in FIG. 2. However, the lengths of cooling lines may vary depending on distances between a radiator 30 and the thermal management systems of the PMCs 10 since the thermal management systems of the PMCs 10 are connected in series with respect to the radiator 30.

FIG. 2 is a view illustrating a structure of PMCs constituting the power plant, according to an exemplary embodiment of the present disclosure. As illustrated in FIG. 2, each of the PMCs 10 of the power plant according to the exemplary embodiment of the present disclosure may include a coolant temperature control valve (CTV) 11, a coolant supply pump (CSP) 12, a fuel cell 13, a temperature sensor 14, and the controller 15.

The CTV 11 is a valve used to adjust the temperature of coolant. In particular, the CTV 11 regulates the flow rate of low-temperature coolant supplied from the radiator 30. The CSP 12 forces the coolant introduced through the CTV 11 into the fuel cell 13. The temperature sensor 14 may be disposed in a coolant outlet of the fuel cell 13 and configured to measure the temperature of the coolant released from the fuel cell 13. Additionally, the PMC 10 may further include a temperature sensor (not illustrated) disposed in a coolant inlet of the fuel cell 13 and configured to measure the temperature of the coolant flowing into the fuel cell 13.

The controller 15 may be configured to execute overall control to enable the components to perform functions thereof. The controller 15 may be implemented in a hardware or software form, or may be implemented in a form in which hardware and software are combined together. The controller 15 may be implemented with, but is not limited to, a microprocessor. Furthermore, the controller 15 may be configured to transmit a temperature value measured by the temperature sensor 14 to the high-level controller 20 and operate the CTV 11 and the CSP 12, based on a control signal from the high-level controller 20. In particular, the controller 15 may include tables stored therein, one of which (e.g., a first table) includes an opening degree of the CTV 11 recorded therein, in which opening degrees of the CTV 11 that correspond to temperature values are recorded in one table and revolution per minute (RPM) values of the CSP 12 that correspond to temperature values may be recorded in the other table (e.g., a second table).

The high-level controller 20 may be configured to operate the CTVs 11 and the CSPs 12 of the PMCs 10 using the average of temperature values received from the controllers 15 of the PMCs 10. In other words, when the high-level controller 20 calculates the average of the temperature values received from the controllers 15 of the PMCs 10 and transmits the average to the controllers 15 of the PMCs 10, the controllers 15 of the PMCs 10 may be configured to operate the CTVs 11 and the CSPs 12, based on the average received from the high-level controller 20. For example, when receiving a temperature value of about 72° C. from a controller (e.g., a first PMC controller) of a first PMC and a temperature value of about 64° C. from a controller of a second PMC (e.g., a second PMC controller), the high-level controller 20 may be configured to transmit about 68° C., which is the average of 72° C. and 64° C., to the first PMC and the second PMC. Then, the controllers of the first and second PMCs may be configured to operate the CSPs 12 to have an RPM value that corresponds to about 68° C. and operate the CTVs 11 to have an opening degree that corresponds to about 68° C. based on the values stored in the first and second tables.

Additionally, the high-level controller 20 may be configured to operate the CTVs 11 and the CSPs 12 of the PMCs 10 using the maximum value of the temperature values received from the PMCs 10. In other words, when the high-level controller 20 transmits, to the controllers 15 of the PMCs 10, the maximum value of the temperature values received from the controllers 15 of the PMCs 10, the controllers 15 of the PMCs 10 may be configured to operate the CTVs 11 and the CSPs 12, based on the maximum value received from the high-level controller 20.

For example, when receiving a temperature value of about 72° C. from the controller of the first PMC (e.g., first PMC controller) and a temperature value of about 64° C. from the controller of the second PMC (e.g., second PMC controller), the high-level controller 20 may be configured to transmit the maximum value about 72° C. to the first PMC and the second PMC, that is, to each PMC. Then, the controllers of the first and second PMCs may be configured to operate the CSPs 12 to have an RPM value that corresponds to about 72° C. and operate the CTVs 11 to have an opening degree that corresponds to about 72° C. based on the values stored in the first and second tables.

Figure 3:
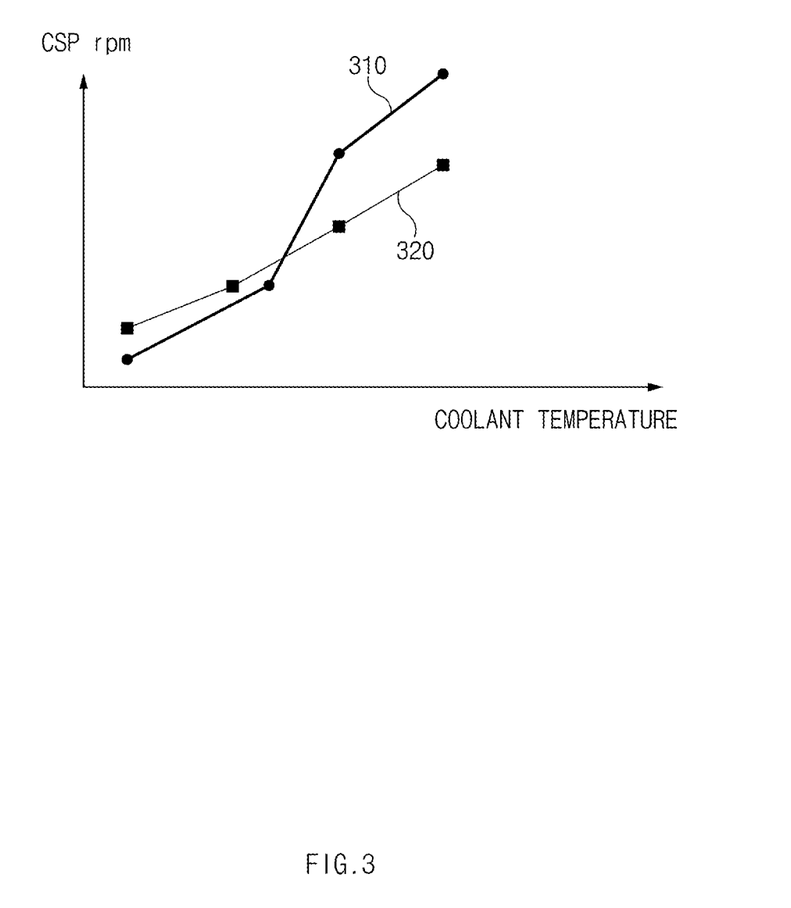
FIG. 3 is a view illustrating a table corresponding to each of the PMCs according to an exemplary embodiment of the present disclosure.

Meanwhile, the high-level controller 20 may be configured to distribute, to each PMC 10, a table generated for the PMC 10, based on a difference in length between the cooling lines and in which RPM values of the CSP 12 that correspond to temperature values are recorded. For example, as illustrated in FIG. 3, the high-level controller 20 may be configured to transmit a first table 310 to the first PMC and a second table 320 to the second PMC. Accordingly, the controllers 15 of the PMCs 10 include different tables, and the high-level controller 20 may be configured to operate RPMs of the CSPs 12 included in the PMCs 10 different despite transmitting the same temperature value to the controllers 15 of the PMCs 10.

For example, when the high-level controller 20 transmits, to the first PMC controller, a table in which about 1000 RPM corresponding to about 68° C. is recorded and, to the second PMC controller, a table in which about 1200 RPM corresponding to about 68° C. is recorded, the controller of the first PMC may be configured to adjust the RPM of the CSP to about 1000 and the controller of the second PMC may be configured to adjust the RPM of the CSP to about 1200 when the temperature of coolant reaches about 68° C. Meanwhile, when a PMC in operation is stopped, the high-level controller 20 may be configured to rapidly cool the stopped PMC using a thermal management system of a continually operating PMC. Accordingly, degradation of the stopped PMC may be prevented.

Figure 4A:
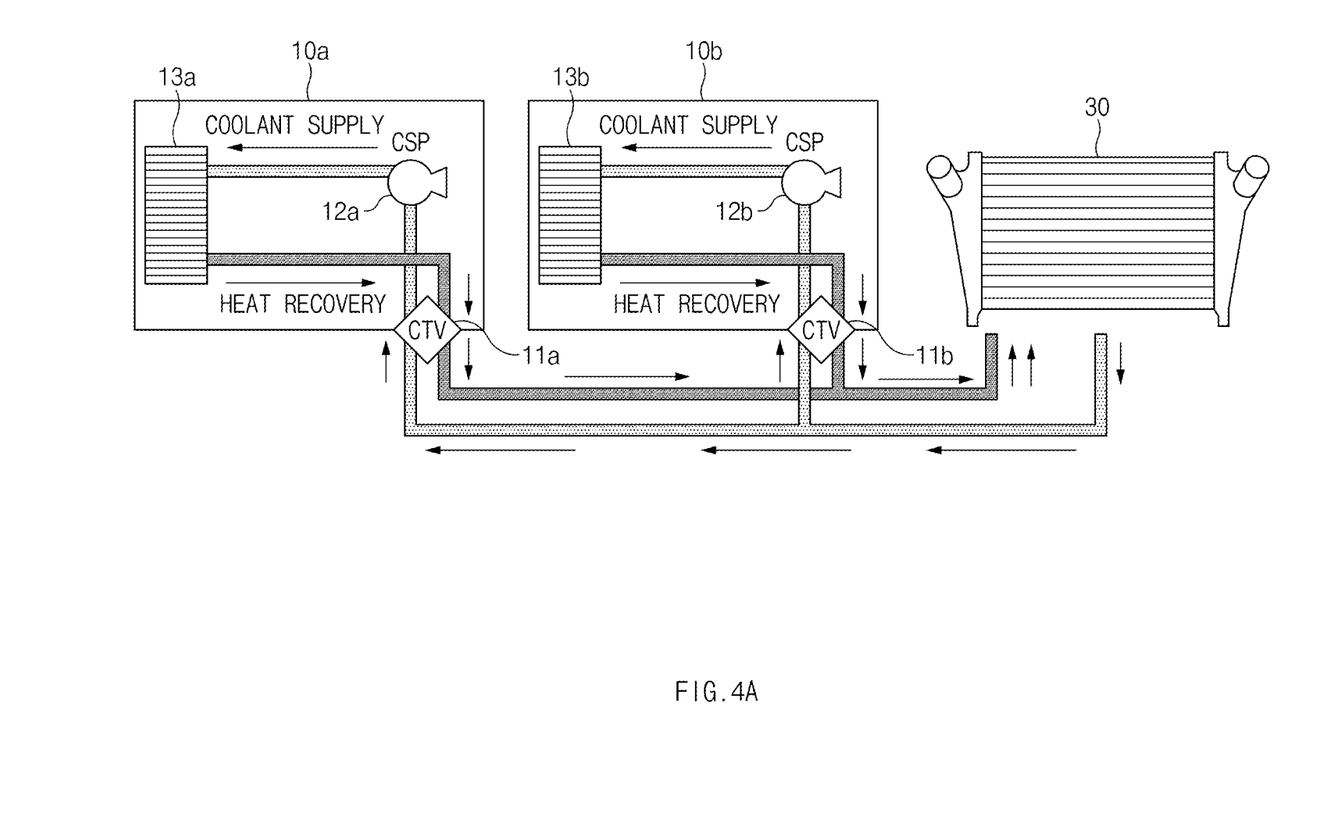

Hereinafter, a method for cooling a stopped PMC using a PMC in operation by the high-level controller 20 will be described in detail with reference to FIGS. 4A and 4B. FIG. 4A is a view illustrating a thermal management system piping structure of a power plant according to an exemplary embodiment of the present disclosure, where FIG. 4A illustrates a coolant circulation structure in a case where both a first PMC 10a and a second PMC 10b are in operation.

As illustrated in FIG. 4A, coolant released from the radiator 30 may be supplied into a fuel cell 13a by a CSP 12a of the first PMC 10a and into a fuel cell 13b by a CSP 12b of the second PMC 10b. At this time, a CTV 11a and a CTV 11b are open. In other words, the CTV 11a and the CTV 11b have a predetermined opening degree. Thereafter, the coolant released from the fuel cell 13a and the coolant released from the fuel cell 13b flow into the radiator 30. In the above-described process, the high-level controller 20 may be configured to operate the RPM of the CSP 12a in the first PMC 10a and the RPM of the CSP 12b in the second PMC 10b differently, thereby compensating for a cooling difference caused by a difference in length between cooling lines that extend from the radiator 30 to the PMCs 10a and 10b.

Figure 4B:
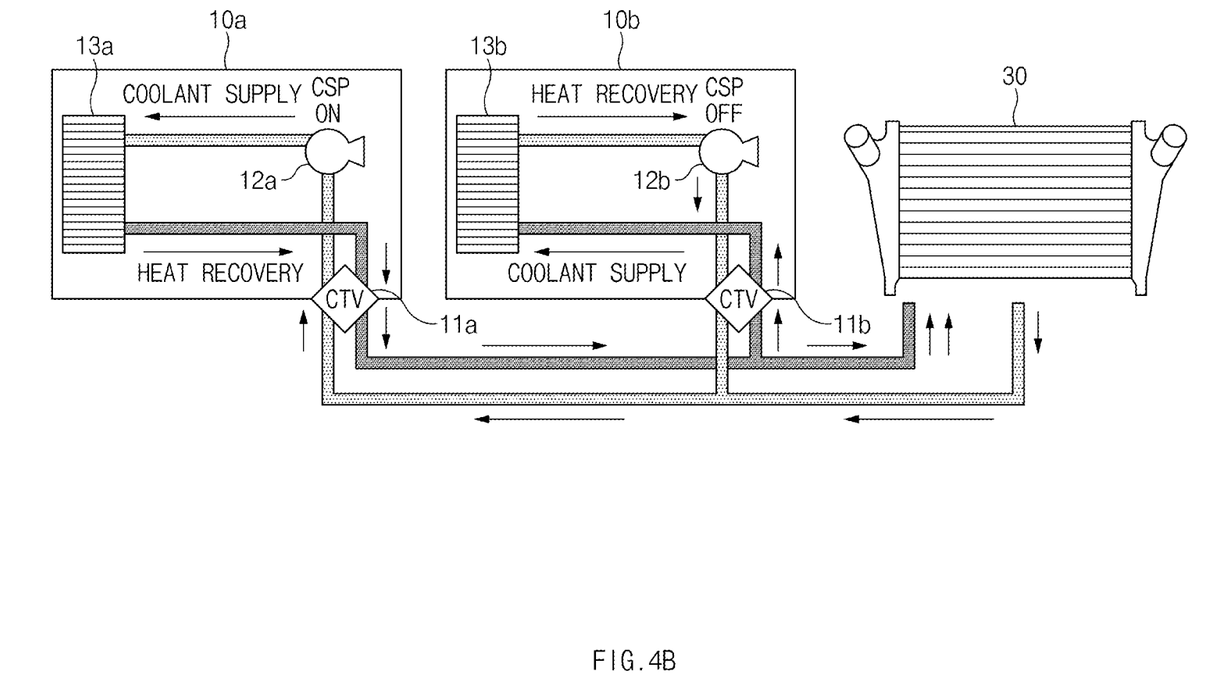

FIG. 4B is a view illustrating a thermal management system piping structure of a power plant according to an exemplary embodiment of the present disclosure, where FIG. 4B illustrates a coolant circulation structure where the first PMC 10a is in operation and the second PMC 10b is stopped. As illustrated in FIG. 4B, coolant released from the radiator 30 is supplied into the fuel cell 13a by the CSP 12a of the first PMC 10a, but not the fuel cell 13b since the CSP 12b of the second PMC 10b does not operate. In particular, the CTV 11a is open for reference period of time under the operation of the high-level controller 20.

Thereafter, part of the coolant released from the fuel cell 13a flows into the radiator 30, but the rest of or remaining the coolant flows into a coolant outlet of the fuel cell 13b and then flows out of a coolant inlet of the fuel cell 13b to meet the coolant released from the radiator 30. In other words, due to the stop of the CSP 12B, the inversion of coolant occurs in the fuel cell 13b, and therefore the coolant flows into the fuel cell 13b through the coolant outlet to cool the fuel cell 13b.

Figure 5:
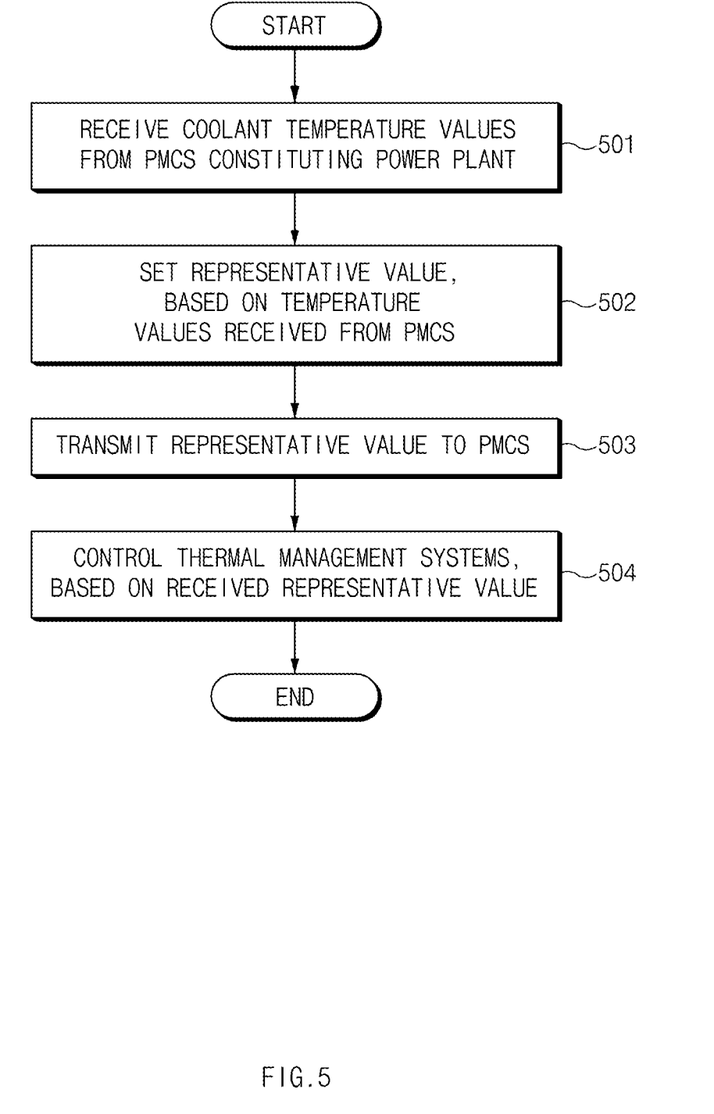
FIG. 5 is a flowchart illustrating a method for controlling thermal management systems of a power plant according to a first exemplary embodiment of the present disclosure.

FIG. 5 is a flowchart illustrating a method for controlling thermal management systems of a power plant according to a first exemplary embodiment of the present disclosure. First, the high-level controller 20 may be configured to receive coolant temperature values from the PMCs 10 of the power plant (Step 501). Next, the high-level controller 20 may be configured to determine a representative value, based on the temperature values received from the PMCs 10 (Step 502). In particular, the high-level controller 20 may be configured to determine the average of the temperature values as the representative value, or determine the maximum value of the temperature values as the representative value. Then, the high-level controller 20 may be configured to transmit the determined representative value to the PMCs 10 (Step 503)

Further, the controllers 15 of the PMCs 10 may be configured to operate the thermal management systems, based on the representative value received from the high-level controller 20 (Step 504). Particularly, the controllers 15 of the PMCs 10 may each include a first table and a second table stored therein, in which an opening degree of the CTV 11 that corresponds to the representative value (the representative temperature value) may be recorded in the first table and an RPM value of the CSP 12 that corresponds to the representative value (the representative temperature value) may be recorded in the second table. The controllers 15 of the PMCs 10 may include the same first and second tables stored therein. Furthermore, the thermal management systems may each include the CTV 11 and the CSP 12.

Figure 6:
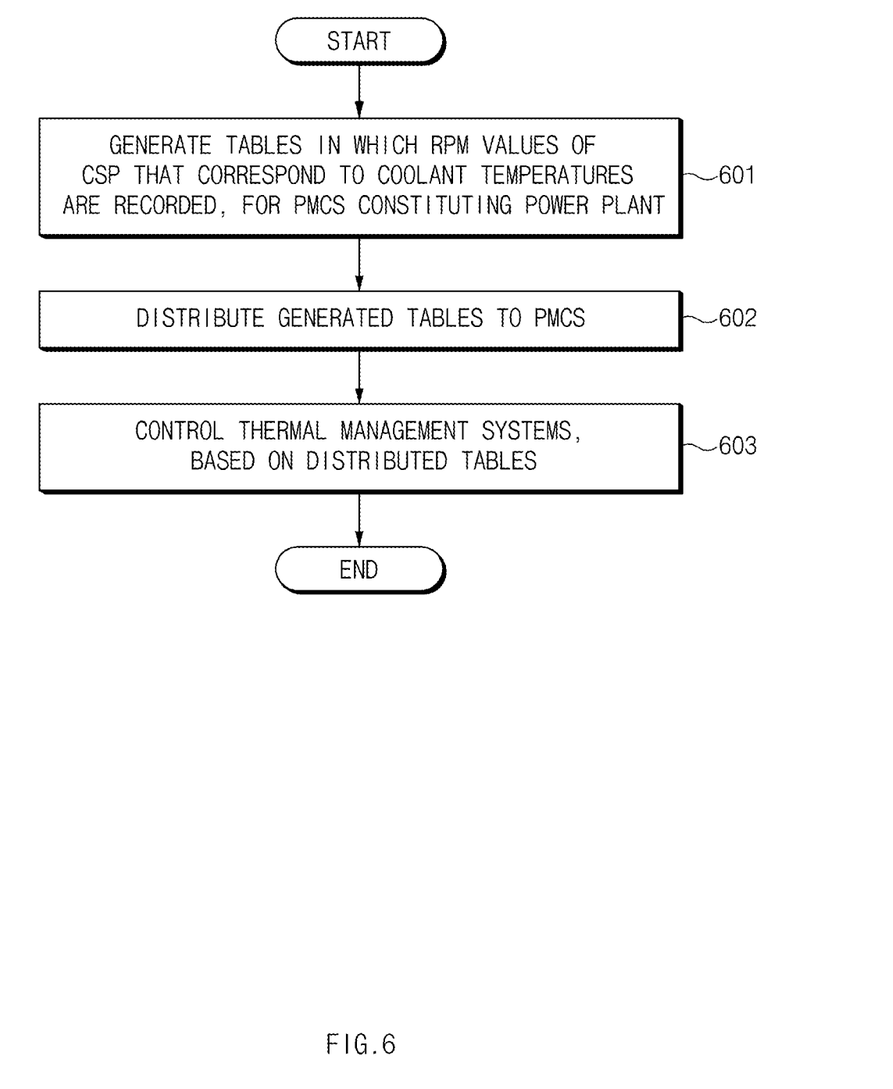
FIG. 6 is a flowchart illustrating a method for controlling thermal management systems of a power plant according to a second exemplary embodiment of the present disclosure.

FIG. 6 is a flowchart illustrating a method for controlling thermal management systems of a power plant according to a second exemplary embodiment of the present disclosure. First, for the PMCs 10 of the power plant, the high-level controller 20 may be configured to generate tables in which RPM values of the CSP 12 that correspond to coolant temperatures are recorded (Step 601). At this time, the high-level controller 20 may be configured to generate the tables in view of a cooling difference caused by a difference in length between the cooling lines that extend from the radiator 30 to the PMCs 10.

The high-level controller 20 may then be configured to distribute the generated tables to the corresponding PMCs 10 (Step 602). The controllers 15 of the PMCs 10 may be configured to operate the thermal management systems, based on the tables distributed by the high-level controller 20 (Step 603). In particular, the controllers 15 of the PMCs 10 may each include a table stored therein, in which opening degrees of the CTV 11 that correspond to the temperature values are recorded.

Figure 7:
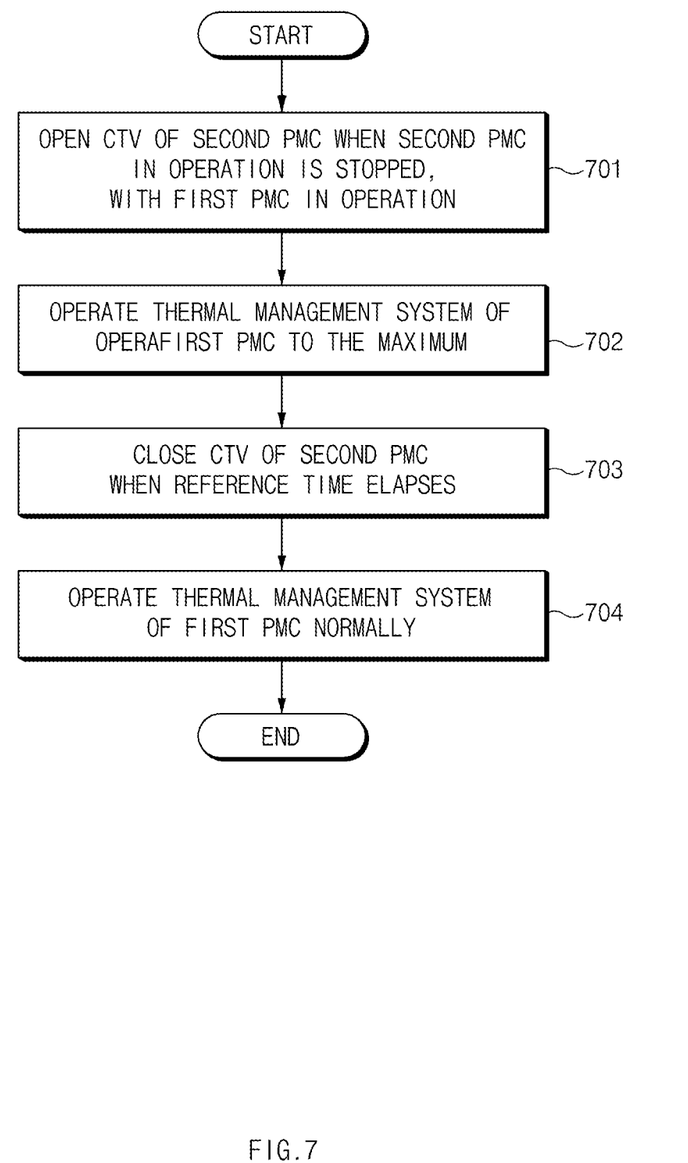
FIG. 7 is a flowchart illustrating a method for controlling thermal management systems of a power plant according to a third exemplary embodiment of the present disclosure.

FIG. 7 is a flowchart illustrating a method for controlling thermal management systems of a power plant according to a third exemplary embodiment of the present disclosure. For a better understanding, a first PMC and a second PMC will be described as an example. However, it should be understood that the following example is applicable even though the number of PMCs increases.

First, the high-level controller 20 may be configured to open a CTV of the second PMC when the second PMC in operation is stopped, with the first PMC in operation (Step 701). In other words, when the second PMC in operation is stopped, the high-level controller 20 may be configured to transmit a control signal to a controller of the second PMC to open the CTV of the second PMC. In particular, the control signal may be a signal indicating to completely open the CTV of the second PMC (e.g., an opening degree of 100%). The high-level controller 20 may then be configured to operate a thermal management system of the first PMC to the maximum (Step 702). In other words, the high-level controller 20 may be configured to transmit a control signal to a controller of the first PMC to operate the thermal management system to the maximum. The control signal may be a signal indicating to completely open a CTV of the first PMC and cause a CSP of the first PMC to have a maximum RPM.

Further, the high-level controller 20 may be configured to close the CTV of the second PMC when reference time elapses (Step 703). In other words, the high-level controller 20 may be configured to transmit a control signal to a controller of the second PMC to close the CTV of the second PMC. Particularly, the control signal may be a signal indicating to completely close the CTV of the second PMC (e.g., an opening degree of 0%). Furthermore, the high-level controller 20 may be configured to operate the thermal management system of the first PMC normally when the reference time lapses (Step 704).

For reference, conditions for stopping one of the first and second PMCs in operation are as follows:
1) One PMC may be stopped when a user-required power output is a low power output. In this case, a PMC proximate to the radiator 30 may be stopped.
2) The first PMC and the second PMC may be sequentially stopped when both the first PMC and the second PMC are stopped. For example, when the second PMC is closer (in distance) to the radiator 30 than the first PMC, the second PMC may be stopped before the first PMC. Thereafter, the stop of the first PMC may be released before the stop of the second PMC.
3) The first PMC and the second PMC may be sequentially shut down when the power plant is shut down. For example, when the second PMC is closer (in distance) to the radiator 30 than the first PMC, the second PMC may be shut down before the first PMC.

Figure 8:
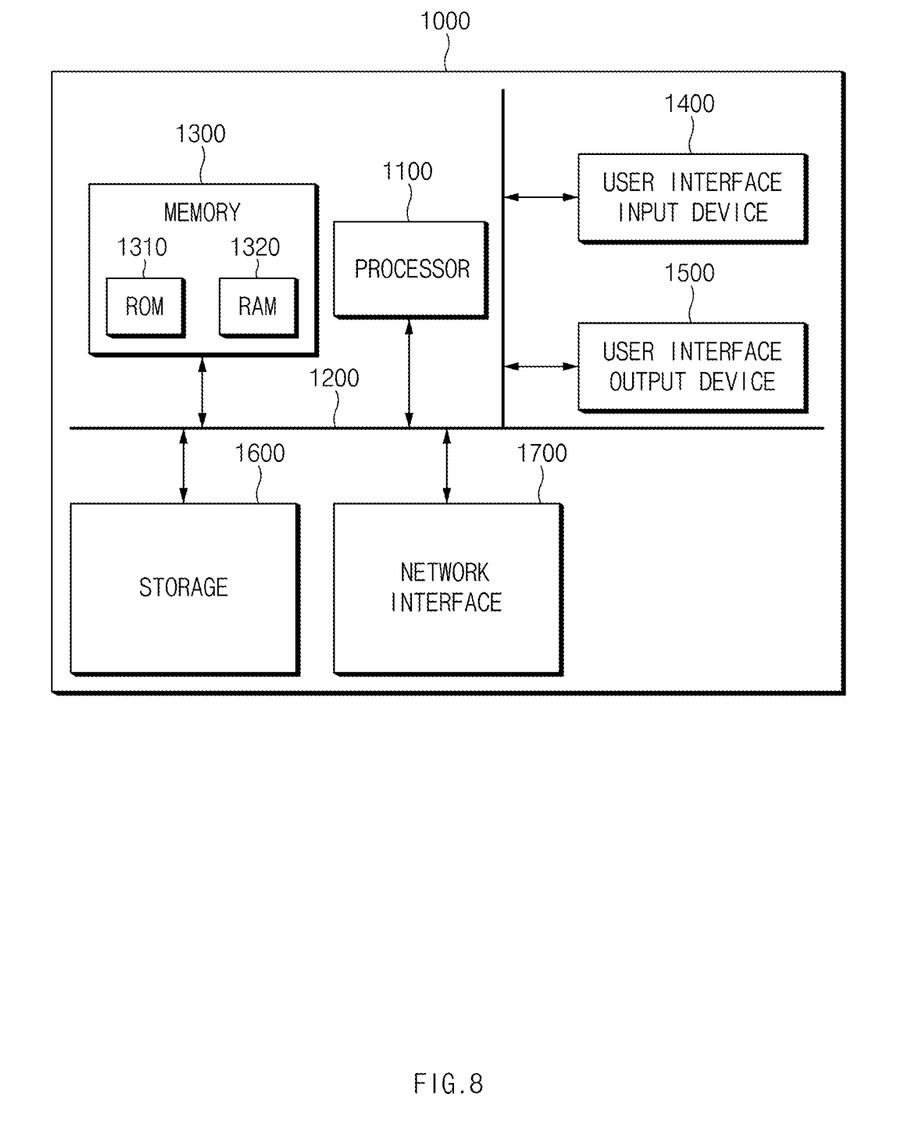
FIG. 8 is a block diagram illustrating a computing system for executing a method for controlling thermal management systems of a power plant according to an exemplary embodiment of the present disclosure.

FIG. 8 is a block diagram illustrating a computing system for executing a method for controlling thermal management systems of a power plant according to an exemplary embodiment of the present disclosure. Referring to FIG. 8, the above-described power plant thermal-management-system control methods according to the exemplary embodiments of the present disclosure may also be implemented through the computing system. The computing system 1000 may include at least one processor 1100, a memory 1300, a user interface input device 1400, a user interface output device 1500, storage 1600, and a network interface 1700 that are coupled together through a system bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage mediums. For example, the memory 1300 may include a read only memory (ROM) 1310 and a random access memory (RAM) 1320. Accordingly, the steps of the methods or algorithms described in relation to the exemplary embodiments disclosed herein may be directly implemented with a hardware module or a software module that is executed by the processor 1100, or a combination thereof.

The software module may reside in a storage medium (e.g., the memory 1300 and/or the storage 1600) such as a RAM memory, a flash memory, a ROM memory, an EPROM memory, an EEPROM memory, a register, a hard disk, a solid state drive (SSD), a detachable disk, or a CD-ROM. The exemplary storage medium may be coupled to the processor 1100, and the processor 1100 may read information out of the storage medium and may record information in the storage medium. Alternatively, the storage medium may be integrated with the processor 1100. The processor 1100 and the storage medium may reside in an application specific integrated circuit (ASIC). The ASIC may reside in a user terminal. In another case, the processor 1100 and the storage medium may reside in the user terminal as separate components.

According to the exemplary embodiments of the present disclosure, the power plant thermal-management-system control methods control the thermal management systems in the PMCs, based on coolant temperatures of the PMCs of the power plant of the fuel cell vehicle, thereby preventing the temperatures of the PMCs from deviating from a reference range, which in turn prevents degradation of the fuel cells.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims. Therefore, the exemplary embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

What is claimed is:

1. A method for controlling thermal management systems of a power plant, comprising:
    opening, by a high-level controller, a temperature control valve (CTV) of a second power module complete (PMC) when the second PMC in operation is stopped, while a first PMC is in operation;
    operating, by the high-level controller, a thermal management system of the first PMC to a maximum;
    closing, by the high-level controller, the CTV of the second PMC when a reference time lapses; and
    operating, by the high-level controller, the thermal management system of the first PMC normally when the reference time lapses.

2. The method of claim 1, wherein the opening of the CTV of the second PMC includes:

opening, by the high-level controller, the CTV of the second PMC to an opening degree of 100%.

3. The method of claim 1, wherein the operating of the thermal management system of the first PMC to the maximum includes:

opening, by the high-level controller, a CTV of the first PMC to an opening degree of 100%; and operating, by the high-level controller, a coolant supply pump (CSP) of the first PMC at a maximum revolutions per minute (RPM).

4. The method of claim 1, wherein the closing of the CTV of the second PMC includes:

closing, by the high-level controller, the CTV of the second PMC to an opening degree of 0%.

* * * * *